United States Patent
Gruber et al.

(10) Patent No.: US 12,463,465 B2
(45) Date of Patent: Nov. 4, 2025

(54) WEARABLE DEVICE, SMART CARD AND SYSTEM

(71) Applicant: Infineon Technologies AG, Neubiberg (DE)

(72) Inventors: Josef Gruber, Sankt Ruprecht an der Raab (AT); Walther Pachler, Graz (AT); Andreas Woerle, Graz (AT)

(73) Assignee: Infineon Technologies AG, Neubiberg (DE)

( * ) Notice: Subject to any disclaimer, the term of this patent is extended or adjusted under 35 U.S.C. 154(b) by 704 days.

(21) Appl. No.: 17/852,590

(22) Filed: Jun. 29, 2022

(65) Prior Publication Data

US 2023/0006477 A1     Jan. 5, 2023

(30) Foreign Application Priority Data

Jul. 2, 2021   (DE) .......................... 102021117142.3

(51) Int. Cl.
| | |
|---|---|
| *H02J 7/00* | (2006.01) |
| *H02J 50/00* | (2016.01) |
| *H02J 50/12* | (2016.01) |
| *H02J 50/27* | (2016.01) |
| *H02J 50/60* | (2016.01) |
| *H02J 50/80* | (2016.01) |

(52) U.S. Cl.
CPC ............ *H02J 50/12* (2016.02); *H02J 50/005* (2020.01); *H02J 50/27* (2016.02); *H02J 50/60* (2016.02); *H02J 50/80* (2016.02); *H02J 2310/22* (2020.01)

(58) Field of Classification Search
CPC .......... H02J 50/12; H02J 50/005; H02J 50/27; H02J 50/60; H02J 50/80; H02J 2310/22
USPC .......................................... 320/108; 307/104
See application file for complete search history.

(56) References Cited

U.S. PATENT DOCUMENTS

| | | | |
|---|---|---|---|
| 2015/0145471 A1* | 5/2015 | Huijser | ................... H02J 50/12 320/108 |
| 2020/0167628 A1* | 5/2020 | Pachler | ............ G06K 19/07794 |

FOREIGN PATENT DOCUMENTS

| | | | | |
|---|---|---|---|---|
| DE | 102015105610 B3 | | 3/2016 | |
| EP | 2879269 A1 | | 6/2015 | |
| EP | 3447875 A1 | * | 2/2019 | .............. H02J 50/12 |

OTHER PUBLICATIONS

Jun. 2, 2022 (DE) Office Action—App 102021117142.3.

* cited by examiner

*Primary Examiner* — Zixuan Zhou
(74) *Attorney, Agent, or Firm* — Banner & Witcoff Ltd.

(57) ABSTRACT

A wearable device including an antenna structure, a chip having a receiver which is electrically coupled to the antenna structure and is configured to receive radio signals by means of the antenna structure, and a trigger device which is arranged in or on the wearable device, which device comprises electrically conductive material and which is configured to trigger foreign object detection in a wireless energy charger in accordance with a wireless charging standard for wirelessly charging an electronic device by means of taking up load from radio waves emitted by the wireless energy charger.

19 Claims, 4 Drawing Sheets

WEARABLE DEVICE, SMART CARD AND SYSTEM

TECHNICAL FIELD

The disclosure relates to a wearable device, a chip card and a system.

BACKGROUND

FIG. 1 illustrates a wireless charging process in which a smartphone 102 is charged wirelessly by means of a wireless energy charger 106 in accordance with a wireless charging standard (for example a Qi charging station or a comparable apparatus that uses another standard; charger for short).

The smartphone 102 is located in a smartphone case 108, which corresponds to a conventional storage method, in which case chip cards 104 are also stored, the chip cards being set up for near-field communication (NFC), for example as pure contactless chip cards or for example as dual-interface chip cards, and/or other contactless cards such as, for example, key cards which use RFID (radio frequency identification) technology.

If the chip cards 104 are left in the case 108 during the charging process, they are highly likely to be damaged.

This is because, even though the standardized chargers 106 are set up to detect metallic foreign objects in the charging area and to interrupt the charging process for safety reasons, the chargers 106 are sometimes not set up to identify wearables (for example the chip cards 104), which are set up for contactless communication and not provided for the charging process, or they are set up to identify wearables at most with considerable outlay and/or a certain efficiency (see aspect below).

This means that the charging process is carried out (for example restarted and/or continued) even in a situation as described above in which the chip card 104 is located in the charging area. The chip card 104 made then be compelled to take up energy and convert it to heat, which may damage the chip card.

Currently established or planned measures for preventing damage to wearables (also referred to as wearable devices or contactless devices for, for example, NFC, RFID, for example the chip cards 104) caused by wireless energy chargers 106 may relate to the contactless devices, the chargers 106 or to both and may be, for example, the following:

1. The contactless device may be set up to detect a high energy supply to the contactless device and to provide a structure which is suitable for withstanding and/or diverting and/or consuming even high amounts of energy without being damaged. To this end, for example, special antennas and/or additional capacitors are used.

However, such chip-based measures are expensive and complex.

2. In a situation as illustrated in FIG. 1 in which the smartphone 102 itself is set up as an NFC/RFID receiver, the smartphone 102 may be set up to detect the simultaneous presence of the charger and the contactless device and to warn a user and/or the charger so that the contactless device can be removed or the charger can be switched off. This measure can be implemented without additional hardware and with at most moderate software modifications.

For this measure, however, it is necessary that the mobile telephone is capable of NFC/RFID and the function is activated and that the charger is also set up to receive the message. It is not possible to use this measure to prevent damage to a contactless device which is brought into the charging area without a smartphone or with a smartphone not capable of NFC/RFID or a smartphone capable of NFC/RFID in which the NFC/RFID is deactivated.

3. The charger may itself be fitted with an NFC/RFID reader which is set up to detect a contactless device in the charging area and to switch off the charger. The NFC/RFID reader may comprise an additional antenna, for example.

Although this additional hardware provision may enable a reliable function, may be purely on the charger side so that the smartphone and the contactless device manage without adjustments and may be able to be used for additional functions (for example payment functions), the charger is significantly more complex and expensive to manufacture as a result.

SUMMARY

Various exemplary aspects provide a wearable device or a chip card which comprises an additional device which is designed so that the foreign object detection already integrated as standard in wireless energy chargers in accordance with a wireless charging standard (for example a Qi station or a comparable apparatus that uses another standard; (charger for short) is triggered.

In various exemplary aspects, the device may be formed as an electrically conductive structure arranged in a manner electrically insulated from a chip and an antenna of the wearable device or the chip card.

The device may be formed, for example, as a metal surface, as a metal ring or as an antenna or resonant circuit tuned to a charging frequency of the charger.

BRIEF DESCRIPTION OF THE DRAWINGS

Exemplary aspects of the disclosure are illustrated in the figures and are explained in more detail below.

In the figures.

DETAILED DESCRIPTION

Figure 1:
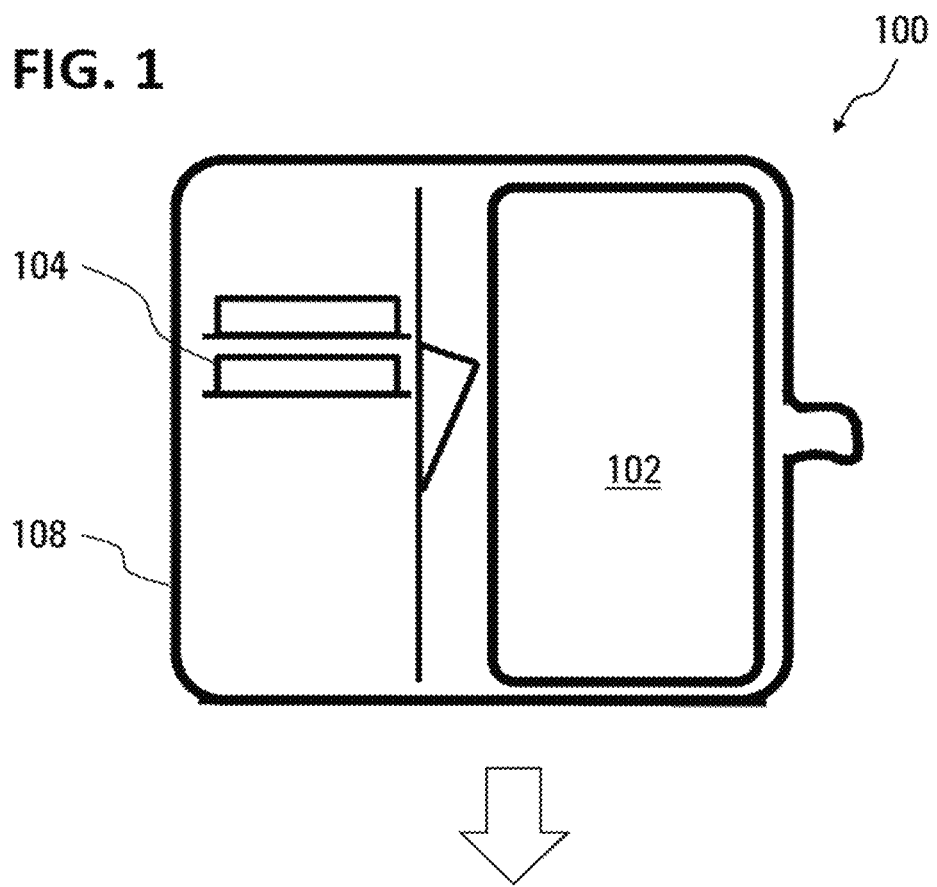
FIG. 1 illustrates a wireless charging process for charging a smartphone.
Figure 1:
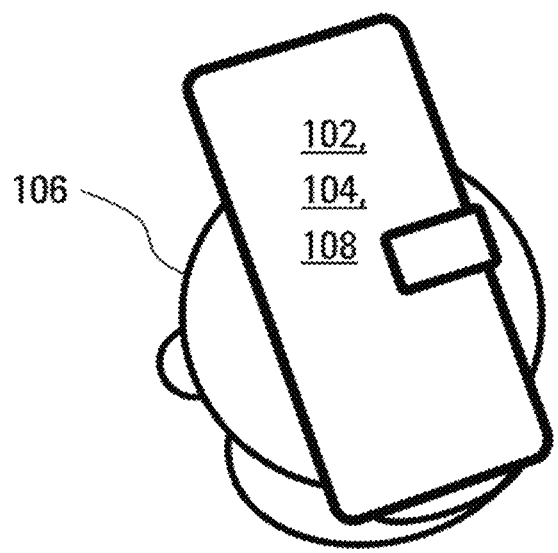

In the following detailed description, reference is made to the accompanying drawings which form part of said description and show, for illustration, specific aspects in which the aspects of the disclosure can be performed. In this respect, direction terminology, for instance "at the top", "at the bottom", "at the front", "at the rear", "front", "rear", etc., is used with reference to the orientation of the described figure(s). Since components of aspects can be positioned in a number of different orientations, the direction terminology is used for illustration and is not restrictive in any way. It goes without saying that other aspects can be used and structural or logical changes can be made without departing from the scope of protection of the present disclosure. It goes without saying that the features of the various exemplary aspects described herein can be combined with one another, unless specifically stated otherwise. The following detailed description therefore should not be interpreted in a restrictive sense, and the scope of protection of the present disclosure is defined by the attached claims.

Within the scope of this description, the terms "linked," "connected," and "coupled" are used to describe both a direct and an indirect link, a direct or indirect connection, and direct or indirect coupling. In the figures, identical or similar elements are provided with identical reference signs if expedient.

Wireless energy chargers often use a direct Q measurement in order to detect the presence of an object in the charging area of said chargers (for example on a transfer surface). In the direct Q measurement, changes in the quality factor (Q factor) of a transmitter coil or changes in the inductance thereof or the resistance thereof are monitored.

In other methods, changes in a capacity value, a reflectivity or a transmissivity, a weight, a pressure, a resonance at 1 MHz and/or a metal detection by means of additional coils are used.

The Qi standard contains information about the foreign object detection which is used in accordance with the standard and which is based on a method that detects and analyzes a shift in resonance and has similarities to the change in the quality factor.

The fact that most (if not all) receivers also induce a change in the resistance can be used to improve the detection accuracy but does not permit any assertion about whether the detected object would absorb enough energy during a charging process in order to noticeably heat up.

In various exemplary aspects, wearable devices such as, for example, chip cards (smartcards), key fobs, bracelets, necklaces, watches or rings are supplemented so that they are able to trigger foreign object detection of a wireless energy charger configured in accordance with standards.

The supplement may be designed as an electrically conductive device, for example as a metal object, for example a metal layer or a metal ring with a minimum surface area, or as a resonant circuit at a resonant frequency that corresponds to a charging frequency of the charger. The conductive device may be embedded, for example, in the wearable device, for example the chip card.

FIG. 2A to 2D each show a schematic illustration of a wearable device 204, for example illustrated as a chip card 204, in accordance with various exemplary aspects. In various exemplary aspects which are not illustrated, the wearable device may be formed as a key fob, bracelet, necklace, watch, ring or other wearable device 204.

Figure 2A:
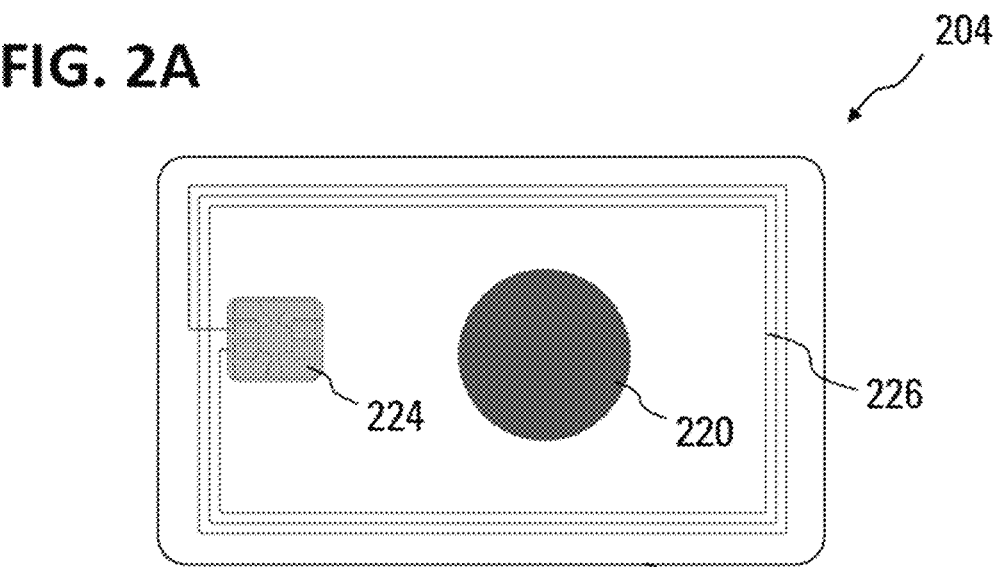
FIGS. 2A to 2D each show a schematic illustration of a wearable device, for example illustrated as a chip card, in accordance with various exemplary aspects.
Figure 2B:
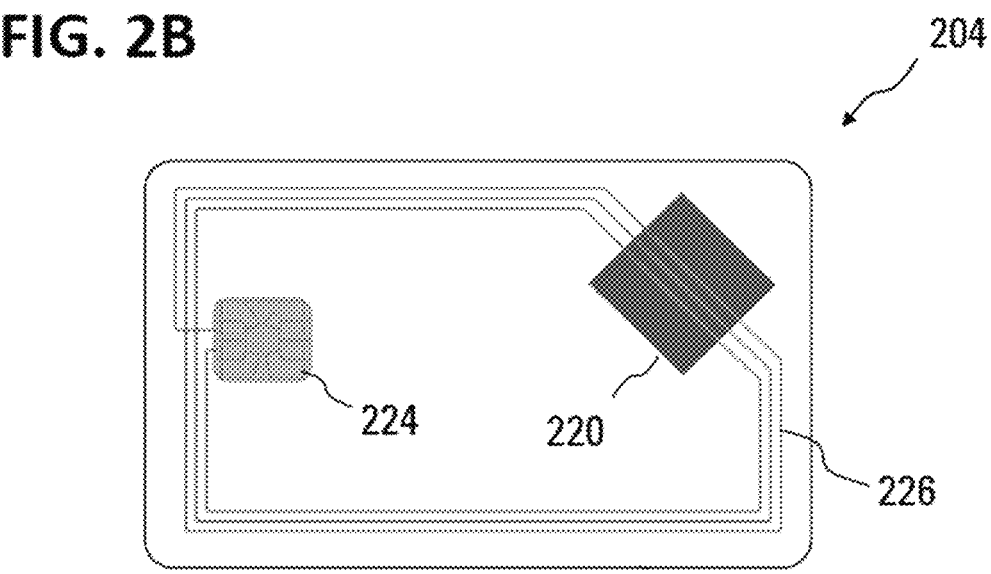
Figure 2C:
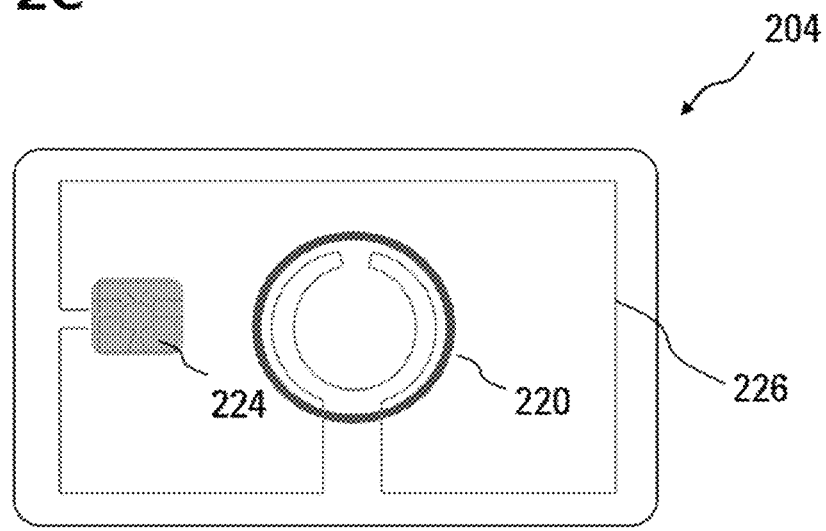
Figure 2D:
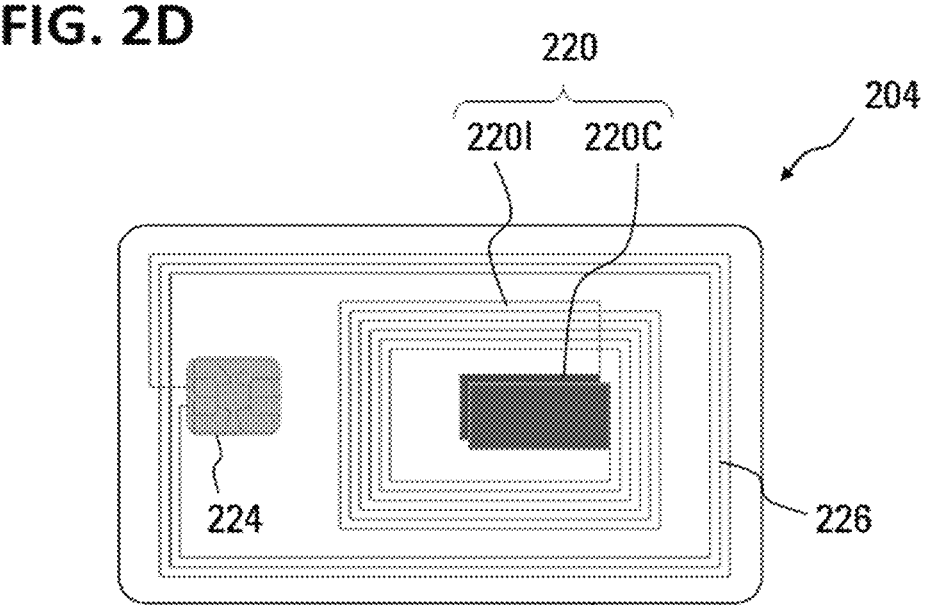
Figure 3:
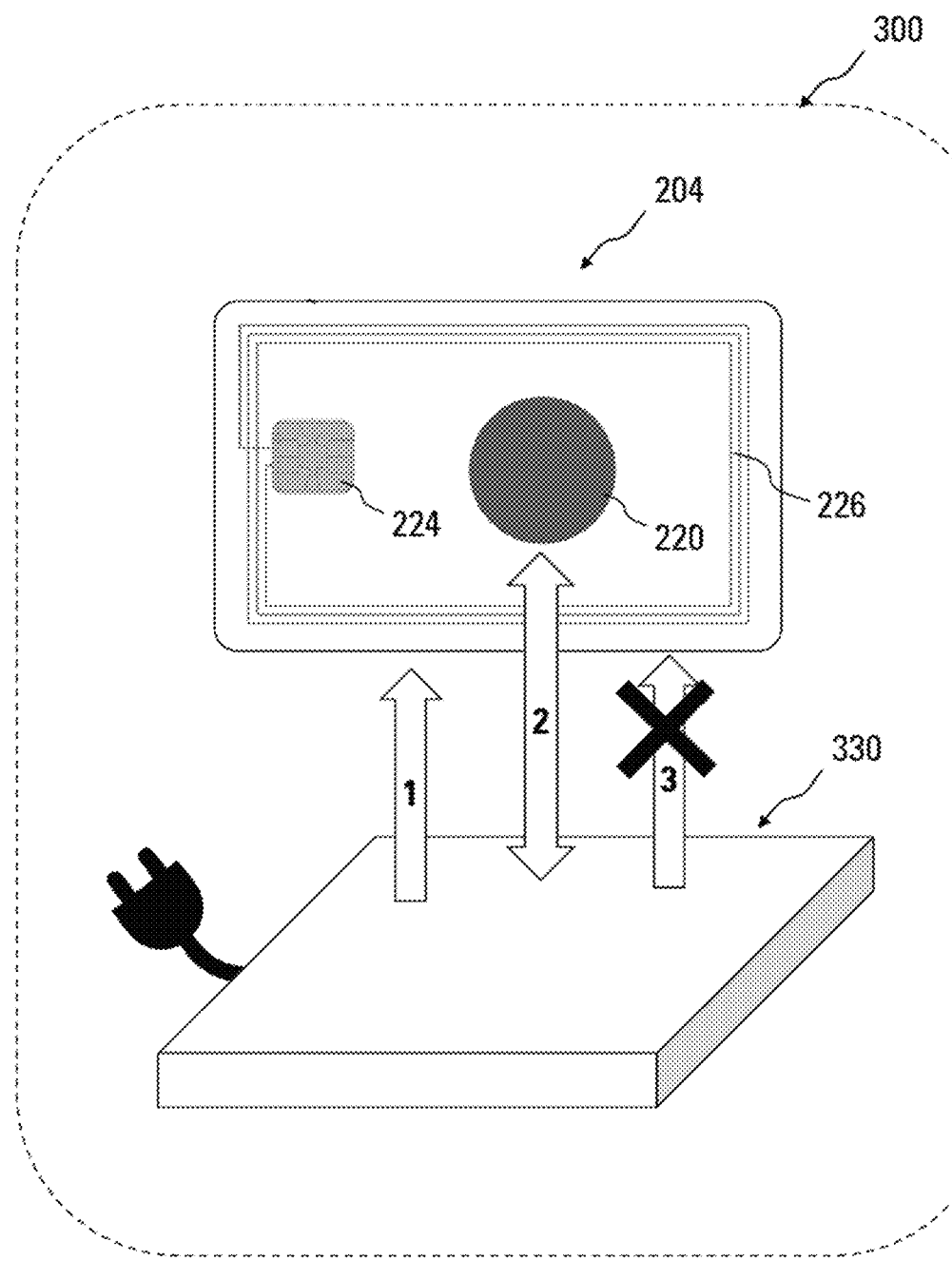
FIG. 3 shows a schematic illustration of a system in accordance with various exemplary aspects.

The wearable device 204 comprises an antenna structure 226 and a chip having a receiver which is electrically coupled to the antenna structure 226 (illustrated in FIG. 2A to FIG. 3 as chip module 224). In FIG. 2A to FIG. 3, the electrical coupling is also illustrated as an electrically conductive connection between the chip/receiver (in this case the chip module 224) and the antenna structure 226. As an alternative, the electrical coupling may also be formed as an inductive coupling, for example as what is known as a coil-on-module coupling.

The chip having the receiver may be set up to receive radio signals by means of the antenna structure 226, for example radio signals from an external reader, for example a payment device or an access control device. Radio signals can be received (and radio signals may also possibly be sent, that is to say contactless communication) essentially as known in the prior art, for example as near-field communication (NFC) or as RFID technology. A carrier frequency of the received radio signals may be, for example, approximately 13.56 MHz.

The wearable device 204 may also comprise a device 220 which is arranged in or on the wearable device 204, which device may comprise electrically conductive material and which may be set up to trigger foreign object detection in a wireless energy charger 330 (see FIG. 3) in accordance with a wireless charging standard for wirelessly charging an electronic device such as, for example, the wearable device 204.

The wireless charging standard may be, for example, the Qi standard, the Powermat standard, the Rezence standard, the Open Dots standard or the international standard IEC 62368-1, or possibly a similar type of standard that already exists or is established in the future.

The foreign object detection can be triggered, for example, based on a load take-up from radio waves emitted by the wireless energy charger 330.

The load may be present in the form of eddy currents, for example.

This may be the case, in particular, when the device 220 is formed as an annular (as in FIG. 2C) or closed surface (as in FIGS. 2A and 2B).

In FIG. 2A to FIG. 3, the chip cards 204 are illustrated as dual-interface chip cards, for example. Although the contact surfaces provided in the chip modules 224 of the dual-interface cards are made of metal, they are not suitable for triggering the foreign object detection in particular because the structuring thereof into several small individual surfaces means that eddy currents are not produced to a significant extent, in particular not to an extent that exceeds a threshold value for the foreign object detection.

By way of example, the Qi standard is cited, which describes as a reference object that is detected by the foreign object detection a metal structure in the form of a circular area with a diameter of 22 mm and a thickness of 0.1 mm. An aluminum material (AlSi1Mg1Mn 100 Hv) is specified as the material for the metal structure.

By way of example, the international standard IEC 62368-1 is also cited, which describes three reference objects: a metal structure in the form of a circular area with a diameter of 15 mm and a thickness of 1 mm and made of steel 1.1011/RFe 160, a metal structure in the form of a circular area with a diameter of 20 mm and a thickness of 0.1 mm and made of 99.5% aluminum, and a metal structure in the form of a ring with a diameter of 22 mm and a thickness of 1 mm and made from an aluminum material (AlSi1Mg1Mn 100 Hv).

Depending on the relevant standard, the device 220 can be designed in various exemplary aspects so that the design thereof, for example shape, size and material, corresponds to a reference object of a standard. The device 220 can be designed so that the dimensions thereof correspond at least to those of one of the reference objects, and the material of the device 220 can be selected so that it corresponds to the material of the corresponding reference object.

For example, the device 220 may be formed in the manner of a circular area with a diameter of at least 15 mm, for example at least 20 mm, for example at least 22 mm, where a maximum size is restricted by dimensions of the wearable device 204, for example by a width of the chip card 204.

For example, the device 220 may be formed in the manner of a ring with a diameter of at least 20 mm, for example at least 22 mm, where a maximum size is restricted by dimensions of the wearable device 204, for example by a width of the chip card 204.

A thickness of the device may be, for example, between approximately 0.1 mm and approximately 1 mm.

In various exemplary aspects, the device may be made of aluminum, an aluminum material (for example AlSi1Mg1Mn 100 Hv), steel, or another suitable electrically conductive material, for example another metal.

In various exemplary aspects, the device 220 can be formed so that the load take-up is not carried out in the form of eddy currents but by means of an electrical resonant circuit at a resonant frequency that corresponds to a charging frequency of the wireless energy charger 330.

A charging frequency of the wireless energy charger 330 is to be understood in this case as a frequency that is suitable for charging the wireless energy charger 330. This may be, for example, a rated frequency that is provided for charging.

The frequency at which charging takes place, for example in accordance with the Qi standard, is 150 kHz, and a corresponding load take-up can be easily detected by the resonant circuit. In order to meet charging specifications, a resonant circuit with a low Q factor can be used.

Other charging frequencies provided are for example 360 kHz (for example Apple), 87 kHz, or for example 205 kHz.

In accordance with various exemplary aspects, the charging frequency can be set anywhere within a tolerance range. Accordingly, the electrical resonant circuit that is formed by the device 220 can be set up for a power take-up within the tolerance range, for example for a charging frequency, which is in a range of 330 kHz+/−100 kHz.

This is illustrated, by way of example, in FIG. 2D. The device 220 designed as a resonant circuit may comprise, for example, an antenna 2201 and a capacitor 220C, which are electrically conductively connected to one another.

In various exemplary aspects, the device 220 can be formed as a structured metallization layer.

The metallization layer can be formed on an electrically insulating carrier layer in a manner substantially known from chip card production, for example. For example, the metallization layer can be structured, for example by means of a mask, on the carrier layer, for example a plastic (for example PET) carrier layer. As an alternative or in addition, the metallization layer can be formed on the carrier layer over the entire surface or substantially over the entire surface, and can then be structured (for example by means of etching).

In various exemplary aspects, the device 220 together with the antenna 226 can form a joint structured metallization layer. FIG. 2A shows a corresponding exemplary aspect. The antenna 226 and the device 220 may comprise or consist of the same material, and they may be formed or they may have been formed at the same time or substantially at the same time. The antenna 226 and the device 220 can be arranged together on one side of the carrier layer, together on both sides of the carrier layer (and possibly each be connected by means of vias to form continuous lines), or together on one side of the carrier layer while either the device 220 or the antenna 226 is also formed on the second side of carrier layer.

In various exemplary aspects, the antenna 226 and the device 220 may comprise different materials. The antenna 226 and the device 220 may be formed on the same side of the carrier layer or on different sides of the carrier layer in separate processes.

In various exemplary aspects, the device 220 may be prefabricated as an individual part (for example as a small metal plate or metal film) and then incorporated into the wearable device 204, for example the chip card 204. The device 220 may, for example, be inserted into an opening in a chip card carrier and then laminated in, for example in the event that the device 220 has a thickness corresponding to a thickness of the chip card carrier, for example between approximately 0.2 mm and approximately 1 mm. In the event that the device 220 has a thickness that is enough not to be applied after lamination or to be applied at most in an acceptable manner, for example given a thickness of 0.1 to 0.2 m, the device 220 can be laminated in without being inserted into an opening.

In various exemplary aspects, in a plan view of a main side of the chip card 204, the device 220 is arranged at least partly within an area enclosed by the antenna 226. This is shown by way of example in each of FIG. 2A to FIG. 3, wherein in FIG. 2A, FIG. 2D and FIG. 3, the device is arranged completely in the area enclosed by the antenna 226. This arrangement may be advantageous, in particular, with respect to a size and/or design of the device 220. For example, the device 220 of FIG. 2A is able to be formed on a common side of a carrier layer at the same time as the antenna 226. The device 220 of FIG. 2D may make it necessary (in particular due to the capacitor 220C) to extend on both sides of the carrier layer, which is easier when a region covered by the antenna 226 is avoided.

FIG. 2B and FIG. 2C each show exemplary aspects in which the device 220 is located only partly within the region enclosed by the antenna 226. It is thus possible to reduce or minimize an interfering influence of the device 220 on reception and/or transmission properties of the antenna 226 (in particular with respect to the exemplary aspect of FIG. 2C with the annular device 220).

In the case of wearable devices 204 with another shape factor, for example as described above (key fob, watch, etc.), the shaping and arrangement of the device 220 within the wearable device 204 or on the wearable device 204 can be carried out in a manner adjusted accordingly.

FIG. 3 shows a schematic illustration of a system 300 in accordance with various exemplary aspects which comprises a wearable device 204 or a chip card 204 in accordance with various exemplary aspects, and a wireless energy charger 330 in accordance with a wireless charging standard for wirelessly charging the wearable device 204 or the chip card 204.

FIG. 3 illustrates three successive states of foreign object detection for which the wireless energy charger 330 is set up in accordance with the wireless charging standard thereof.

The first state (denoted by 1) may illustrate a test state of charge in which a test charging energy is provided by the charger 330, the test charging energy typically comprising only a fraction of the full charging energy so that no damage is produced even in the presence of a foreign object in the charging area.

The wearable device 204 or the chip card 204 may subsequently interact with the test charging energy (denoted as state 2) by virtue of providing a load, for example by virtue of eddy currents being produced or power being drawn from the resonant circuit. The charger 330 can be set up to detect the load take-up, for example based on the detected opposing fields and/or for example based on an absence of reflection of the test charging energy and/or in another manner.

The charger 330 can be set up to detect as foreign object a load take-up which is detected in such a way and which in particular does not correspond to a load take-up of an electronic device to be charged.

As can be seen based on the state denoted by 3, the test charging energy can be switched off on account of the identified foreign object, and it is possible to dispense with providing the full charging energy.

As an alternative, it is possible to dispense only with the provision of the full charging energy, whereas the test charging energy continues to be provided.

As an alternative, the provision of the test charging energy can be stopped temporarily and regularly be switched on again in order to make it possible to identify the removal of the foreign object.

Some exemplary aspects are stated in summary below.

Exemplary aspect 1 is a wearable device. The wearable device comprises an antenna structure, a chip having a receiver which is electrically coupled to the antenna structure and is set up to receive radio signals by means of the antenna structure, and a device which is arranged in or on the wearable device, which device comprises electrically conductive material and which is set up to trigger foreign object detection in a wireless energy charger in accordance with a wireless charging standard for wirelessly charging an electronic device by means of taking up load from radio waves emitted by the wireless energy charger.

Exemplary aspect 2 is a wearable device according to exemplary aspect 1, wherein the wireless charging standard is one from a group of wireless charging standards, wherein the group comprises a Qi standard, a Powermat standard, a Rezence standard and an Open Dots standard.

Exemplary aspect 3 is a wearable device according to exemplary aspect 1 or 2, wherein the device is formed as an annular or closed surface.

Exemplary aspect 4 is a wearable device according to exemplary aspect 1 or 2, wherein the device comprises an electrical resonant circuit at a resonant frequency that corresponds to a charging frequency of the wireless energy charger.

Exemplary aspect 5 is a wearable device according to any one of exemplary aspects 1 to 4, wherein the device together with the antenna forms a joint structured metallization layer.

Exemplary aspect 6 is a wearable device according to any one of exemplary aspects 1 to 4, wherein the device is separated from the antenna by way of a dielectric layer.

Exemplary aspect 7 is a wearable device according to anyone of exemplary aspects 1 to 6, wherein the wearable device is formed as a chip card, a key fob, a bracelet, a necklace, a watch or a ring.

Exemplary aspect 8 is a chip card. The chip card comprises an antenna structure, a chip having a receiver which is electrically coupled to the antenna structure and is set up to receive radio signals by means of the antenna structure, and a device which is arranged in or on the chip card, which device comprises electrically conductive material and which is set up to trigger foreign object detection in a wireless energy charger in accordance with a wireless charging standard for wirelessly charging an electronic device, wherein the triggering is effected by means of taking up load from radio waves emitted by the wireless energy charger.

Exemplary aspect 9 is a chip card according to exemplary aspect 8, which further comprises an electrically insulating carrier layer on which the antenna structure is formed.

Exemplary aspect 10 is a chip card according to exemplary aspect 9, wherein the device is formed on the same side as the antenna structure or on a side of the carrier layer facing away from the antenna structure.

Exemplary aspect 11 is a chip card according to any one of exemplary aspects 8 to 10, wherein the wireless charging standard is one from a group of wireless charging standards, wherein the group comprises a Qi standard, a Powermat standard, a Rezence standard and an Open Dots standard.

Exemplary aspect 12 is a chip card according to any one of exemplary aspects 8 to 11, wherein the device is formed as an annular or closed surface.

Exemplary aspect 13 is a chip card according to any one of exemplary aspects 8 to 12, wherein the device comprises an electrical resonant circuit at a resonant frequency that corresponds to a charging frequency of the wireless energy charger.

Exemplary aspect 14 is a chip card according to any one of exemplary aspects 8 to 13, wherein the device together with the antenna forms a joint structured metallization layer.

Exemplary aspect 15 is a chip card according to any one of exemplary aspects 8 to 13, wherein the device is separated from the antenna by way of a dielectric layer.

Exemplary aspect 16 is a wearable device. The wearable device comprises an antenna structure, a chip having a receiver which is electrically coupled to the antenna structure and is set up to receive radio signals by means of the antenna structure, and a device which is arranged in or on the wearable device, wherein the surface of the electrically conductive material is set up to trigger foreign object detection in a wireless energy charger in accordance with a wireless charging standard for wirelessly charging an electronic device by means of taking up load from radio waves emitted by the wireless energy charger.

Exemplary aspect 17 is a wearable device according to exemplary aspect 16, wherein, on a side facing the wireless energy charger, the surface of the device has an area of at least 177 mm$^2$ or surrounds an area of at least 380 mm$^2$ as a closed ring.

Exemplary aspect 18 is a wearable device according to exemplary aspect 16 or 17, wherein the wireless charging standard is one from a group of wireless charging standards, wherein the group comprises a Qi standard, a Powermat standard, a Rezence standard and an Open Dots standard.

Exemplary aspect 19 is a wearable device according to any one of exemplary aspects 16 to 18, wherein the surface forms an annular or closed surface.

Exemplary aspect 20 is a wearable device according to any one of exemplary aspects 16 to 19, wherein the device together with the antenna forms a joint structured metallization layer.

Exemplary aspect 21 is a wearable device according to any one of exemplary aspects 16 to 20, wherein the device is separated from the antenna by way of a dielectric layer.

Exemplary aspect 22 is a wearable device according to any one of exemplary aspects 16 to 21, wherein the wearable device is formed as a chip card, a key fob, a bracelet, a necklace, a watch or a ring.

Exemplary aspect 23 is a chip card. The chip card comprises an antenna structure, a chip having a receiver which is electrically coupled to the antenna structure and is set up to receive radio signals by means of the antenna structure, and a device which is arranged in or on the chip card, which device comprises electrically conductive material, wherein the surface of the electrically conductive material is set up to trigger foreign object detection in a wireless energy charger in accordance with a wireless charging standard for wirelessly charging an electronic device, wherein the triggering is effected by means of taking up load from radio waves emitted by the wireless energy charger.

Exemplary aspect 24 is a chip card according to exemplary aspect 23, wherein, on a side facing the wireless energy charger, the surface of the device has an area of at least 177 mm$^2$ or surrounds an area of at least 380 mm$^2$ as a closed ring.

Exemplary aspect 25 is a chip card according to exemplary aspect 23 or 24, wherein, in a plan view of a main side of the chip card, the device is arranged at least partly within an area enclosed by the antenna.

Exemplary aspect 26 is a chip card according to exemplary aspect 23, wherein the antenna is formed as a loop antenna, wherein, in a plan view of a main side of the chip card, the device forms a ring, and wherein the loop antenna is formed so that antenna sections running parallel to one another are arranged within an area enclosed by the annular device in plan view.

Exemplary aspect 27 is a chip card according to any one of exemplary aspects 23 to 26, wherein the device together with the antenna forms a joint structured metallization layer.

Exemplary aspect 28 is a chip card according to any one of exemplary aspects 23 to 27, wherein the device is separated from the antenna by way of a dielectric layer.

Exemplary aspect 29 is a system which comprises at least one wearable device according to any one of exemplary aspects 1 to 7 or 16 to 22 and a wireless energy charger which is set up to charge the wearable device in accordance with a wireless charging standard and to detect foreign objects in accordance with the standard.

Exemplary aspect 30 is a system which comprises at least one chip card according to any one of exemplary aspects 8 to 15 or 23 to 28 and a wireless energy charger which is set up to charge the chip card in accordance with a wireless charging standard and to detect foreign objects in accordance with the standard.

The invention claimed is:

1. A wearable device, comprising:
   an antenna structure;
   a chip having a receiver which is electrically coupled to the antenna structure and is configured to receive radio signals by means of the antenna structure; and
   a trigger device which is arranged in or on the wearable device, comprises electrically conductive material, and is configured to trigger foreign object detection in a wireless energy charger in accordance with a wireless charging standard for wirelessly charging an electronic device by means of taking up load from radio waves emitted by the wireless energy charger.

2. The wearable device as claimed in claim 1, wherein the wireless charging standard is selected from a group of wireless charging standards consisting of: a Qi standard; a Powermat standard; a Rezence standard; and an Open Dots standard.

3. The wearable device as claimed in claim 1, wherein the trigger device is formed as an annular or closed surface.

4. The wearable device as claimed in claim 1, wherein the trigger device comprises an electrical resonant circuit at a resonant frequency that corresponds to a charging frequency of the wireless energy charger.

5. The wearable device as claimed in claim 1, wherein the trigger device together with the antenna structure forms a joint structured metallization layer.

6. The wearable device as claimed in claim 1, wherein the trigger device is separated from the antenna structure by way of a dielectric layer.

7. The wearable device as claimed in claim 1, wherein the wearable device is formed as a chip card, a key fob, a bracelet, a necklace, a watch, or a ring.

8. A system, comprising:
   at least one wearable device as claimed in claim 1; and
   a wireless energy charger which is configured to charge the wearable device in accordance with a wireless charging standard and to detect foreign objects in accordance with the wireless charging standard.

9. A chip card, comprising:
   an antenna structure;
   a chip having a receiver which is electrically coupled to the antenna structure and is configured to receive radio signals by means of the antenna structure; and
   a trigger device which is arranged in or on the chip card, comprises electrically conductive material, and is configured to trigger foreign object detection in a wireless energy charger in accordance with a wireless charging standard for wirelessly charging an electronic device, wherein the triggering is effected by means of taking up load from radio waves emitted by the wireless energy charger.

10. The chip card as claimed in claim 9, further comprising:
    an electrically insulating carrier layer on which the antenna structure is formed.

11. The chip card as claimed in claim 10, wherein the trigger device is formed on a same side of the chip card as the antenna structure.

12. The chip card as claimed in claim 10, wherein the trigger device is formed on a side of the electrically insulating carrier layer facing away from the antenna structure.

13. A system, comprising:
    at least one chip card as claimed in claim 8; and
    a wireless energy charger which is configured to charge the chip card in accordance with a wireless charging standard and to detect foreign objects in accordance with the wireless charging standard.

14. A wearable device, comprising:
    an antenna structure;
    a chip having a receiver which is electrically coupled to the antenna structure, and is configured to receive radio signals by means of the antenna structure; and
    a trigger device which is arranged in or on the wearable device, and comprises electrically conductive material, wherein a surface of the electrically conductive material is configured to trigger foreign object detection in a wireless energy charger in accordance with a wireless charging standard for wirelessly charging an electronic device, and wherein the triggering is effected by means of taking up load from radio waves emitted by the wireless energy charger.

15. The wearable device as claimed in claim 14, wherein, on a side facing the wireless energy charger, a surface of the trigger device has an area of at least 177 mm$^2$ or surrounds an area of at least 380 mm$^2$ as a closed ring.

16. A chip card, comprising:
    an antenna structure;
    a chip having a receiver which is electrically coupled to the antenna structure, and is configured to receive radio signals by means of the antenna structure; and
    a trigger device which is arranged in or on the chip card, and comprises electrically conductive material, wherein a surface of the electrically conductive material is configured to trigger foreign object detection in a wireless energy charger in accordance with a wireless charging standard for wirelessly charging an electronic device, and wherein the triggering is effected by means of taking up load from radio waves emitted by the wireless energy charger.

17. The chip card as claimed in claim 16, wherein, on a side facing the wireless energy charger, a surface of the trigger device has an area of at least 177 mm$^2$ or surrounds an area of at least 380 mm$^2$ as a closed ring.

18. The chip card as claimed in claim 16, wherein, in a plan view of a main side of the chip card, the trigger device is arranged at least partly within an area enclosed by the antenna structure.

19. The chip card as claimed in claim 16,
    wherein the antenna structure is formed as a loop antenna;

wherein, in a plan view of a main side of the chip card, the trigger device forms a ring; and wherein the loop antenna is formed so that antenna sections running parallel to one another are arranged within an area enclosed by the trigger device in the plan view.

\* \* \* \* \*